(12) United States Patent
Abo et al.

(10) Patent No.: US 10,422,712 B2
(45) Date of Patent: Sep. 24, 2019

(54) PRESSURE DETECTION DEVICE AND PRESSURE SENSOR

(71) Applicant: Surpass Industry Co., Ltd., Gyoda-shi, Saitama (JP)

(72) Inventors: Kazuo Abo, Saitama (JP); Masamichi Kobayashi, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 16/054,204

(22) Filed: Aug. 3, 2018

(65) Prior Publication Data

US 2019/0056280 A1 Feb. 21, 2019

(30) Foreign Application Priority Data

Aug. 18, 2017 (JP) ................. 2017-158048

(51) Int. Cl.
*G01L 19/00* (2006.01)
*G01L 9/00* (2006.01)

(52) U.S. Cl.
CPC .......... *G01L 19/003* (2013.01); *G01L 9/0044* (2013.01); *G01L 9/0051* (2013.01);
(Continued)

(58) Field of Classification Search
CPC ... G01L 19/147; G01L 9/0055; G01L 9/0042; G01L 9/0052; G01L 9/0054; G01L 9/0051; G01L 9/06; G01L 19/06; G01L 19/0645; G01L 19/148; G01L 1/16; G01L 9/00; G01L 19/0038; G01L 19/0069;
(Continued)

(56) References Cited

U.S. PATENT DOCUMENTS 5,392,653 A * 2/1995 Zanger ..................... A61B 5/03
600/488
6,058,779 A 5/2000 Cole
(Continued)

FOREIGN PATENT DOCUMENTS

| EP | 1213035 A1 | 6/2002 |
|----|------------|--------|
| JP | 2005-207946 A | 8/2005 |
| WO | 2012166980 A2 | 12/2012 |

OTHER PUBLICATIONS

Extended European Search Report dated Jan. 15, 2019 in corresponding EP Application No. 18187048.6, 9 pages.

*Primary Examiner* — Andre J Allen
(74) *Attorney, Agent, or Firm* — MH2 Technology Law Group, LLP (57) ABSTRACT

Provided is a pressure detection device, wherein a pressure detection unit includes: a pressure detecting diaphragm; a second connection portion; and four strain resistance portions. One of either a first connection portion or the second connection portion is formed of a magnet, and the other of either the first connection portion or the second connection portion is formed of a magnet or a magnetic body. The first connection portion and the second connection portion are arranged such that the first connection portion and the second connection portion are attracted by a magnetic force in a state where a flow passage unit is mounted on the pressure detection unit. The four strain resistance portions are attached to a region of a second surface of a pressure detecting diaphragm other than a center portion.

7 Claims, 7 Drawing Sheets

(52) U.S. Cl.
CPC ........ *G01L 9/0055* (2013.01); *G01L 19/0023* (2013.01); *G01L 19/0046* (2013.01); *G01L 2009/0067* (2013.01)

(58) Field of Classification Search
CPC ... G01L 19/0084; G01L 19/0627; G01L 1/14; G01L 1/18; G01L 1/205; G01L 27/002; G01L 9/0041; G01L 9/0072; G01L 9/008; G01L 9/065; G01L 13/025; G01L 19/0023; G01L 19/0046; G01L 19/04; G01L 19/0609; G01L 19/14; G01L 19/142; G01L 19/143; G01L 1/144; G01L 1/2206; G01L 1/225; G01L 1/2281; G01L 9/0002; G01L 9/0044; G01L 9/006; G01L 9/0075; G01L 9/02; G01L 9/025; G01L 11/04; G01L 13/00; G01L 13/06; G01L 15/00; G01L 17/00; G01L 19/003; G01L 19/0061; G01L 19/0092; G01L 19/086; G01L 19/141; G01L 19/145; G01L 1/005; G01L 1/106; G01L 1/12; G01L 1/142; G01L 1/146; G01L 1/148; G01L 1/20; G01L 1/2262; G01L 1/2287; G01L 1/247; G01L 1/26; G01L 2009/0067; G01L 2019/0053; G01L 23/10; G01L 23/125; G01L 23/22; G01L 23/24; G01L 25/00; G01L 27/005; G01L 27/007; G01L 27/02; G01L 5/00; G01L 5/10; G01L 5/161; G01L 7/00; G01L 7/061; G01L 7/082; G01L 9/0004; G01L 9/0005; G01L 9/0048; G01L 9/0091; G01L 9/04; G01L 9/08; G01L 9/12; G01L 9/16
USPC .................................................... 73/700–756
See application file for complete search history.

(56) References Cited

U.S. PATENT DOCUMENTS

| | | | |
|---|---|---|---|
| 6,684,710 B2* | 2/2004 | Chevallet | A61M 1/3639 73/723 |
| 9,551,625 B2* | 1/2017 | Brugger | G01L 9/0041 |
| 9,835,509 B2* | 12/2017 | Brugger | G01L 9/0041 |
| 2002/0107468 A1 | 8/2002 | Chevallet et al. | |
| 2005/0160828 A1* | 7/2005 | Hasunuma | G01L 19/0023 73/715 |
| 2018/0128698 A1 | 5/2018 | Brugger et al. | |

* cited by examiner

PRESSURE DETECTION DEVICE AND PRESSURE SENSOR

CROSS-REFERENCE TO RELATED APPLICATIONS

This application is based on Japanese Patent Application No. 2017-158048, the contents of which are incorporated herein by reference in its entirety.

TECHNICAL FIELD

The present disclosure relates to a pressure detection device provided with a mounting mechanism which allows a flow passage unit to be detachably mounted on a pressure detection unit, and to a pressure sensor.

BACKGROUND ART

Conventionally, there is known an inline pressure sensor where a body and a sensor body are formed into one integral body, wherein a flow passage, through which a liquid such as a liquid medicine is made to flow, is formed in the body, and the sensor body detects a pressure of the liquid which is transmitted to a pressure receiving surface through a protective sheet (see Japanese Unexamined Patent Application, Publication No. 2005-207946 (hereinafter referred to as Patent Literature 1), for example).

The pressure sensor disclosed in Patent Literature 1 is configured to detect a pressure of a fluid which is transmitted to the sensor body through the protective sheet mounted on a lower surface of the sensor body.

SUMMARY

Technical Problem

The pressure sensor disclosed in Patent Literature 1 can acquire a detection value which corresponds to a pressure of a fluid pressing the protective sheet when the protective sheet is pressed to the lower surface of the sensor body by the pressure of the fluid.

However, the pressure sensor disclosed in Patent Literature 1 cannot acquire a detection value which corresponds to a pressure (negative pressure) of a fluid when the pressure of the fluid lowers such that the protective sheet receives a force by which the protective sheet is separated from the lower surface of the sensor body. This is because the pressure sensor disclosed in Patent Literature 1 is an electrostatic capacitance type pressure sensor or a piezoelectric type pressure sensor which acquires, as a detection value, a force by which the lower surface of the sensor body is pressed. Accordingly, the pressure sensor disclosed in Patent Literature 1 cannot detect a pressure of a fluid with accuracy when the pressure of the fluid is a negative pressure.

To detect a pressure of a fluid with accuracy even when the pressure of the fluid is a negative pressure, a new mechanism may be provided to a pressure detection device. In such a case, it is necessary to take a countermeasure to prevent the mechanism from reducing pressure detection accuracy.

The present disclosure has been made under such circumstances, and it is an object of the present disclosure to provide a pressure detection device and a pressure sensor which adopts a mechanism enabling accurate detection of a pressure of a fluid, even when the pressure of the fluid is a negative pressure, while suppressing the reduction of pressure detection accuracy.

Solution to Problem

To solve the above-mentioned problem, the present disclosure adopts the following solutions.

According to one aspect of the present disclosure, there is provided a pressure detection device which includes: a flow passage unit in which a flow passage for introducing a fluid is formed; a pressure detection unit configured to detect a pressure of the fluid; and a mounting mechanism by which the flow passage unit is detachably mounted on the pressure detection unit. The flow passage unit includes: a pressure receiving diaphragm configured to be displaced upon receiving the pressure of the fluid flowing through the flow passage on a first surface of the pressure receiving diaphragm; and a first connection portion attached to a second surface of the pressure receiving diaphragm. The pressure detection unit includes: a pressure detecting diaphragm having a first surface to which a pressure is to be transmitted from the first connection portion; a second connection portion attached to a center portion of a second surface of the pressure detecting diaphragm; and four strain resistance portions attached to the second surface of the pressure detecting diaphragm, the strain resistance portions being connected to each other so as to form a Wheatstone bridge circuit. One of either the first connection portion or the second connection portion is formed of a magnet, and the other of either the first connection portion or the second connection portion is formed of a magnet or a magnetic body. The first connection portion and the second connection portion are arranged such that the first connection portion and the second connection portion are attracted by a magnetic force in a state where the flow passage unit is mounted on the pressure detection unit by the mounting mechanism. The four strain resistance portions are attached to a region of the second surface of the pressure detecting diaphragm other than the center portion.

According to the pressure detection device of one aspect of the present disclosure, in a state where the flow passage unit is mounted on the pressure detection unit by the mounting mechanism, the first connection portion, which is attached to the second surface of the pressure receiving diaphragm, and the second connection portion, which is attached to the center portion of the second surface of the pressure detecting diaphragm, are arranged such that the first connection portion and the second connection portion are attracted by a magnetic force. With such a configuration, when a pressure of a fluid flowing through the flow passage is a positive pressure, the first connection portion attached to the pressure receiving diaphragm is separated from the flow passage side by the pressure of the fluid, and the first connection portion is pressed toward the first surface of the pressure detecting diaphragm. Accordingly, a pressure of the fluid is detected by the four strain resistance portions attached to the second surface of the pressure detecting diaphragm as a positive pressure. On the other hand, when a pressure of a fluid flowing through the flow passage is a negative pressure, the first connection portion attached to the second surface of the pressure receiving diaphragm is pulled toward the flow passage side by the pressure of the fluid, and the first connection portion pulls the second connection portion connected to the first connection portion by a magnetic force to the flow passage side. Accordingly, a pressure of the fluid is detected by the four strain resistance portions on the pressure detecting diaphragm as a negative pressure.

Further, the four strain resistance portions are attached to the region of the second surface of the pressure detecting diaphragm other than the center portion. Accordingly, compared to a case where the strain resistance portions are disposed at the center portion of the pressure detecting diaphragm where the displacement is suppressed due to attachment of the second connection portion, the reduction of pressure detection accuracy can be suppressed.

As described above, according to the pressure detection device of one aspect of the present disclosure, it is possible to provide a pressure detection device which adopts the mechanism enabling accurate detection of a pressure of a fluid, even when the pressure of the fluid is a negative pressure, while suppressing the reduction of pressure detection accuracy.

In the pressure detection device according to one aspect of the present disclosure, a pair of the strain resistance portions are disposed at positions of two opposite sides of four sides of the Wheatstone bridge circuit, and the pair of the strain resistance portions may be disposed in a first region disposed adjacent to the center portion. A pair of the strain resistance portions are disposed at positions of the other two opposite sides of the four sides of the Wheatstone bridge circuit, and the pair of the strain resistance portions may be disposed in a second region which is further separated from the center portion than the first region.

The first region disposed adjacent to the center portion of the pressure detecting diaphragm is liable to extend with the displacement caused by a pressure. The second region, which is further separated from the center portion than the first region, is liable to contract with the displacement caused by a pressure. By disposing the four strain resistance portions within the first region and the second region, pressure detection accuracy is enhanced.

In the pressure detection device according to one aspect of the present disclosure, a third region may be formed on the second surface of the pressure detecting diaphragm. The third region is further separated from the center portion than the first region, and is closer to the center portion than the second region. The third region may include a region which has a minimum amount of deformation in a radial direction in a state where a pressure is transmitted from the first connection portion.

With such a configuration, the four strain resistance portions are disposed in the first region and the second region which are not the third region. The strain resistance portions are disposed in a region having a large amount of deformation in the radial direction caused by a pressure. Accordingly, compared to a case where the strain resistance portions are disposed in the third region which includes a region which has a minimum amount of deformation in the radial direction when a pressure is transmitted from the first connection portion, pressure detection accuracy is enhanced.

In the pressure detection device according to one aspect of the present disclosure, each of the four strain resistance portions may include a plurality of strain resistance elements. The plurality of strain resistance elements may be disposed at different positions in a circumferential direction about the center portion.

The plurality of strain resistance elements which form the four strain resistance portions are disposed at different positions in the circumferential direction. With such a configuration, even when displacement of the pressure detecting diaphragm differs at respective positions on the same circumference about the center portion, the difference in displacement can be averaged by the plurality of strain resistance elements such that the reduction of pressure detection accuracy can be suppressed.

In the pressure detection device according to one aspect of the present disclosure, the first connection portion may be formed of a magnetic body, and the second connection portion may be formed of a magnet.

The flow passage unit which is to be replaced after use is formed using a magnetic body which is relatively cheap. Accordingly, running costs for continuous use of the pressure detection device can be reduced.

According to one aspect of the present disclosure, there is provided a pressure sensor which includes: a pressure detecting diaphragm having a first surface to which a pressure is to be transmitted; a connection portion attached to a center portion of a second surface of the pressure detecting diaphragm, the connection portion being formed of a magnet or a magnetic body; and four strain resistance portions attached to the second surface of the pressure detecting diaphragm, the strain resistance portions being connected to each other so as to form a Wheatstone bridge circuit. The four strain resistance portions are attached to a region of the second surface of the pressure detecting diaphragm other than the center portion.

According to the pressure sensor of one aspect of the present disclosure, the four strain resistance portions are attached to a region of the second surface of the pressure detecting diaphragm other than the center portion. Accordingly, compared to a case where the strain resistance portions are disposed at the center portion of the pressure detecting diaphragm where the displacement is suppressed due to attachment of the second connection portion, the reduction of pressure detection accuracy can be suppressed.

Advantageous Effects

According to the present disclosure, it is possible to provide a pressure detection device and a pressure sensor which adopt a mechanism enabling accurate detection of a pressure of a fluid, even when the pressure of the fluid is a negative pressure, while suppressing the reduction of pressure detection accuracy.

DESCRIPTION OF EMBODIMENTS

First Embodiment

Hereinafter, a pressure detection device 100 according to a first embodiment of the present disclosure is described with reference to drawings.

Figure 1:
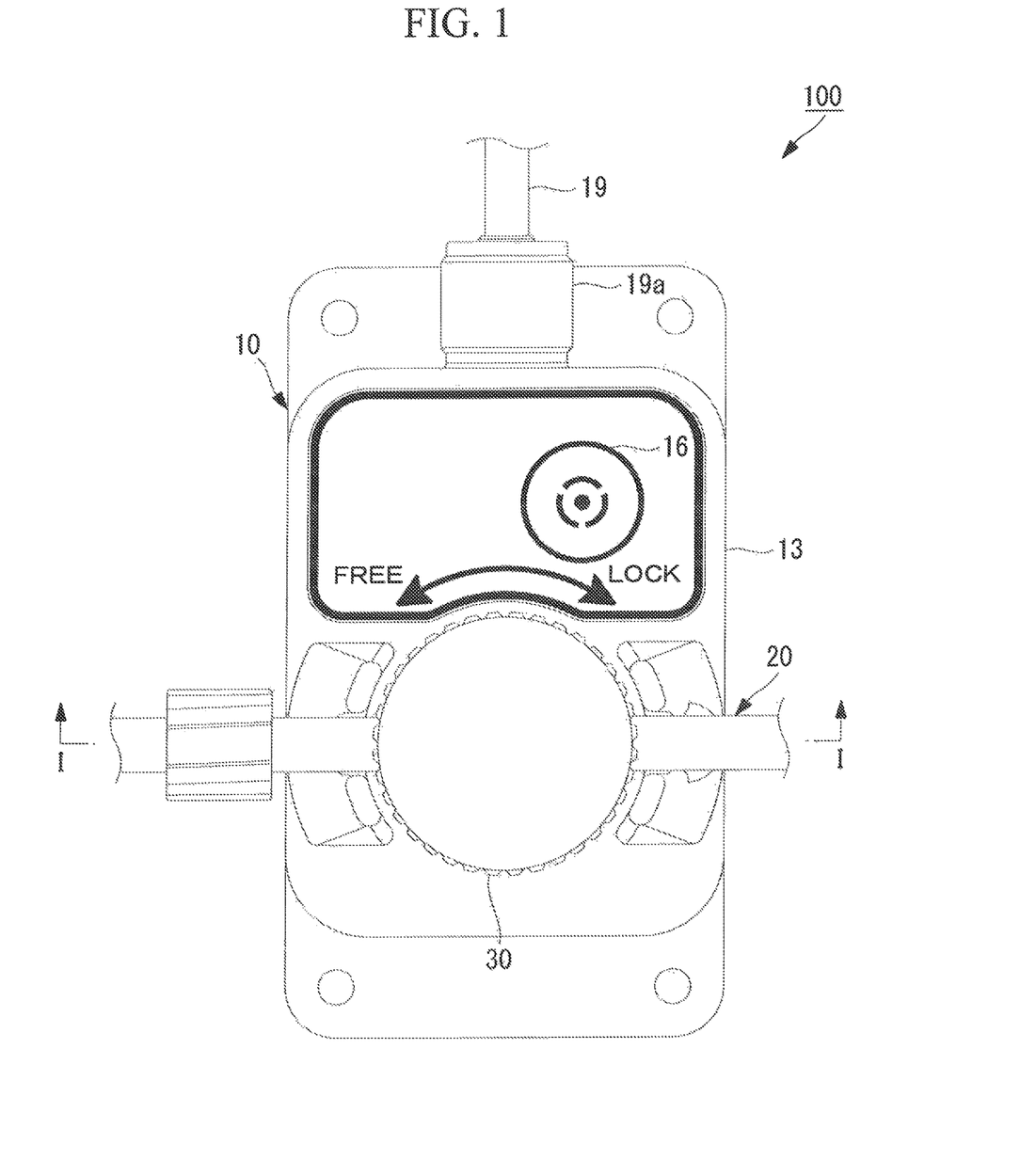
FIG. 1 is a front view showing a pressure detection device of a first embodiment.
Figure 2:
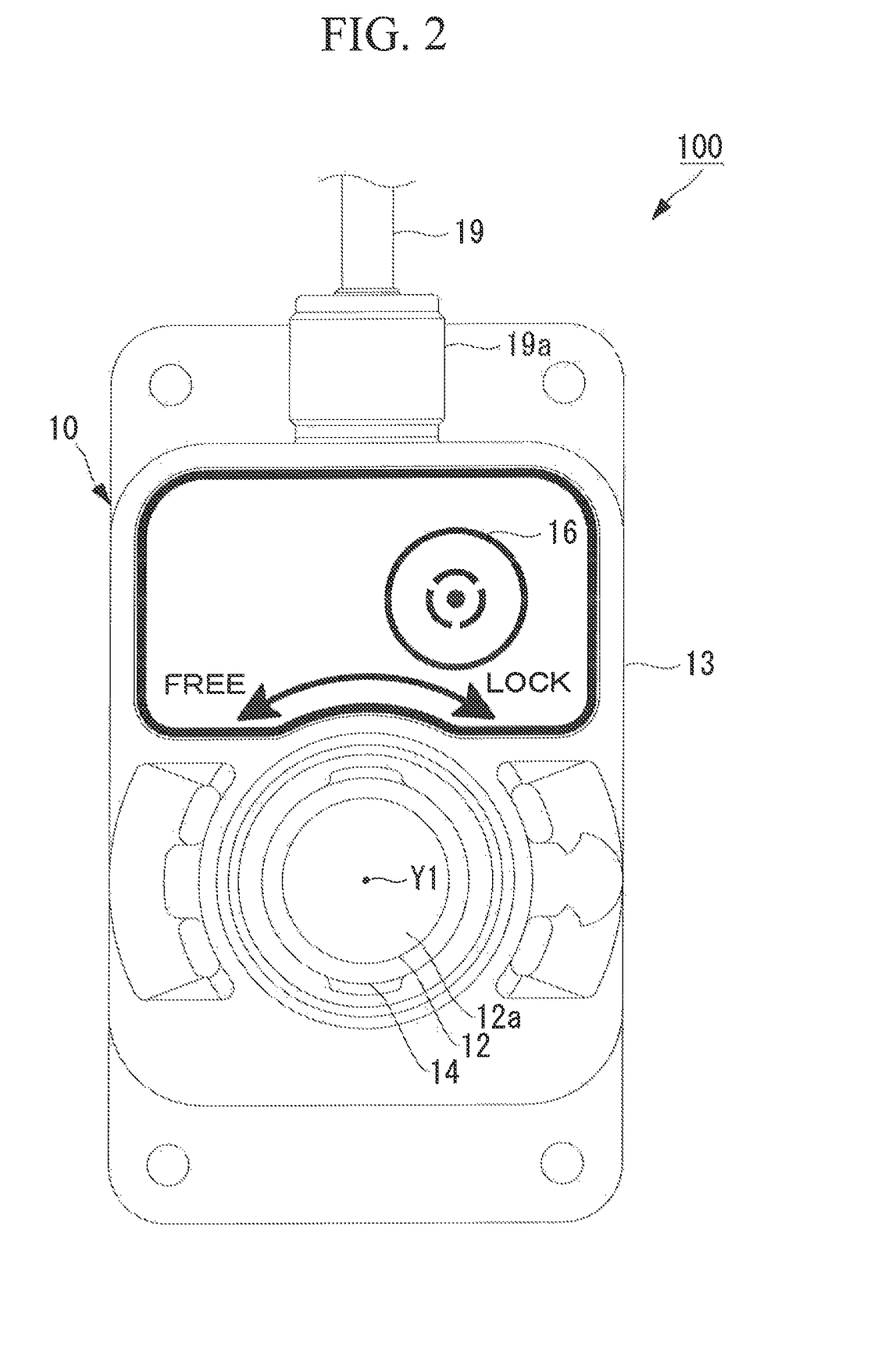
FIG. 2 is a view showing a state where a flow passage unit is removed from the pressure detection device shown in FIG. 1.

As shown in FIG. 1 and FIG. 2, the pressure detection device 100 of this embodiment includes: a pressure detection unit 10; a flow passage unit 20; and a nut (mounting mechanism) 30. The pressure detection unit 10 is mounted on an installation surface S (see FIG. 3) by fastening bolts (not shown in the drawing). A flow passage 21 is formed in the flow passage unit 20, and a fluid is made to flow through the flow passage 21 along a straight-line flow direction from an inflow port 21a to an outflow port 21b. The nut (mounting mechanism) 30 allows the flow passage unit 20 to be detachably mounted on the pressure detection unit 10.

In the pressure detection device 100 of this embodiment, the flow passage unit 20 is mounted on the pressure detection unit 10 by the nut 30. The pressure detection device 100 is mounted on the installation surface S in a state where the flow passage unit 20 is mounted on the pressure detection unit 10 by the nut 30 thus forming an integral body.

Figure 3:
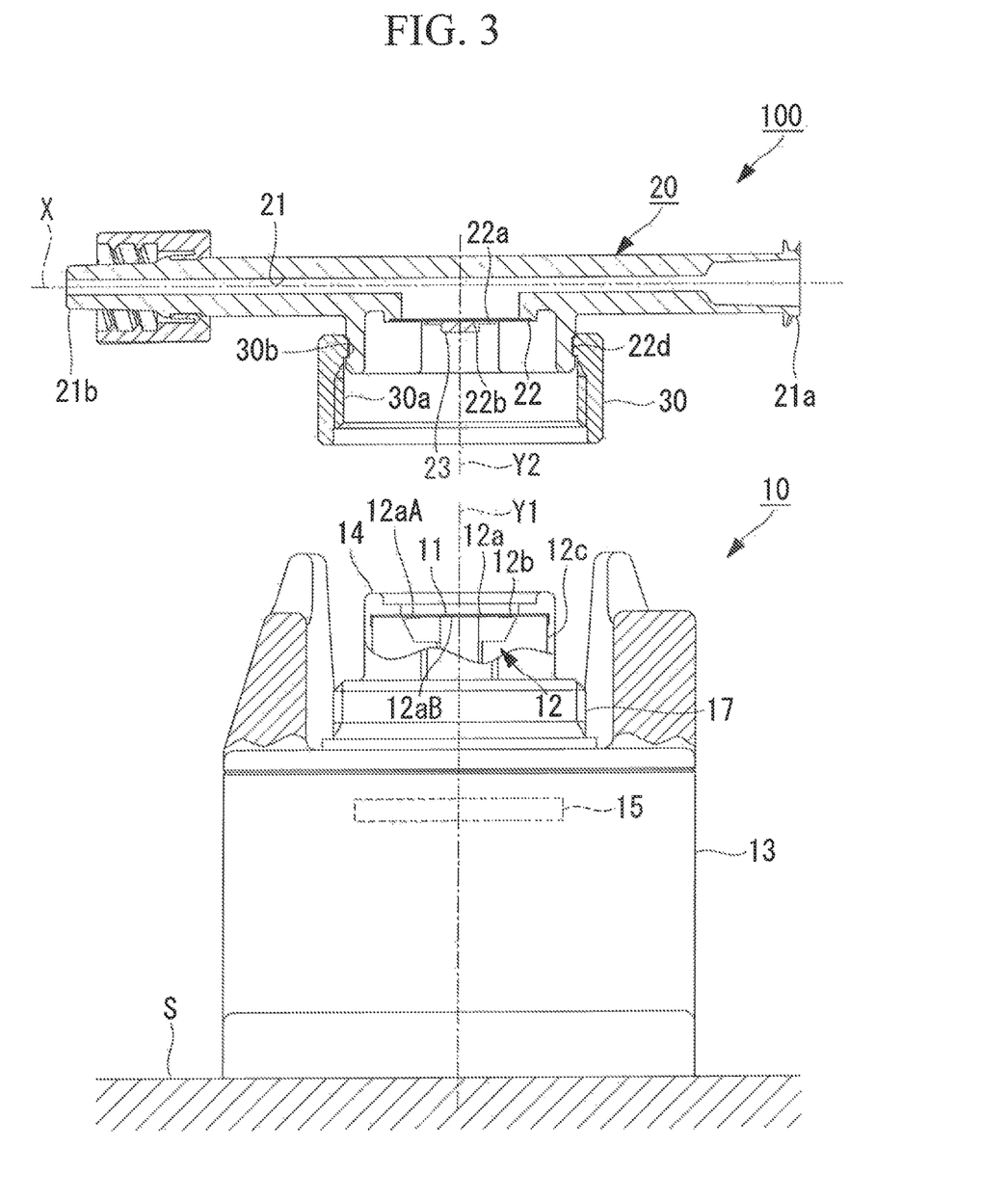
FIG. 3 is a cross-sectional view showing a state where the flow passage unit is removed from the pressure detection device shown in FIG. 1 as viewed from an arrow I-I.

As shown in FIG. 3, an inflow side pipe (not shown in the drawing), through which a fluid is made to flow in the inflow port 21a, is mounted on the inflow port 21a of the flow passage unit 20. An outflow side pipe (not shown in the drawing), through which the fluid flowing out from the outflow port 21b flows, is mounted on the outflow port 21b of the flow passage unit 20. A pressure of a fluid flowing through the flow passage 21 from the inflow port 21a to the outflow port 21b is detected by the pressure detection unit 10. In this embodiment, a fluid means a liquid such as blood or a dialysate, for example.

As shown in FIG. 3, the pressure detection unit 10 includes a body portion 13 mounted on the installation surface S. As shown in FIG. 2 and FIG. 3, a cable 19 is mounted on the body portion 13 of the pressure detection unit 10 by way of a cable mounting nut 19a. The cable 19 electrically connects a pressure sensor 12, which is disposed in the body portion 13, and a control device (not shown in the drawing) disposed outside the body portion 13 to each other.

Next, the pressure detection unit 10 is described in detail with reference to FIG. 1 to FIG. 3. The pressure detection unit 10 shown in FIG. 1 to FIG. 3 is a device which detects a pressure transmitted to a diaphragm (pressure detecting diaphragm) 12a.

As shown in FIG. 1 to FIG. 3, the pressure detection unit 10 includes: a connection portion (second connection portion) 11; the pressure sensor 12; the body portion 13 in which the pressure sensor 12 is disposed; a sensor holding portion 14 which holds the pressure sensor 12 onto the body portion 13; a sensor board 15 for transmitting power and an electric signal between the pressure sensor 12 and the cable 19; and a zero-point adjustment switch 16 for performing a zero-point adjustment of the pressure sensor 12.

The connection portion 11 is formed of a permanent magnet formed into a cylindrical shape along an axis Y1. The connection portion 11 is made of neodymium or the like, for example. The connection portion 11 is attached to a second surface 12aB of the diaphragm 12a of the pressure sensor 12 by an adhesive agent (epoxy resin based adhesive agent, for example). As shown in FIG. 3, an end surface of the connection portion 11 which is attached to the diaphragm 12a is formed to have a planar shape disposed on a plane which is orthogonal to the axis Y1. The connection portion 11 attracts a connection portion 23, which is formed of a magnetic body, by a magnetic force of the permanent magnet, and the connection portion 11 maintains a state where the connection portion 11 is in contact with the connection portion 23. The connection portion 23, which the flow passage unit 20 includes, is described later.

In the description made heretofore, the connection portion 11 is formed of a permanent magnet, and the connection portion 23 is formed of a magnetic body. However, another aspect may be adopted. For example, each of both the connection portion 11 and the connection portion 23 may be formed of a permanent magnet. Alternatively, the connection portion 11 may be formed of a magnetic body, and the connection portion 23 may be formed of a permanent magnet. As described above, in the pressure detection device 100 of this embodiment, either one of the connection portion 11 or the connection portion 23 is formed of a magnet, and the other of the connection portion 11 or the connection portion 23 is formed of a magnet or a magnetic body.

Hereinafter, an example is described where the connection portion 11 is formed of a permanent magnet, and the connection portion 23 is formed of a magnetic body.

As shown in FIG. 3, the pressure sensor 12 includes: the diaphragm (pressure detecting diaphragm) 12a formed into a thin film shape using a material having corrosion resistance (for example, sapphire); strain resistance portions 12b attached to the second surface 12aB of the diaphragm 12a; and a base portion 12c which holds the diaphragm 12a.

The pressure sensor 12 is a strain type sensor. The strain type sensor outputs a pressure signal which corresponds to variations in resistance values of the strain resistance portions 12b, which deform corresponding to a pressure transmitted from the connection portion 23 to a first surface 12aA of the diaphragm 12a. A through hole, which communicates with the diaphragm 12a, is formed in the base portion 12c such that the second surface 12aB of the diaphragm 12a is maintained at an atmospheric pressure. Accordingly, the pressure sensor 12 is a sensor which detects a gauge pressure using an atmospheric pressure as a reference.

The strain resistance portions 12b attached to the second surface 12aB of the diaphragm 12a are described.

Figure 4:
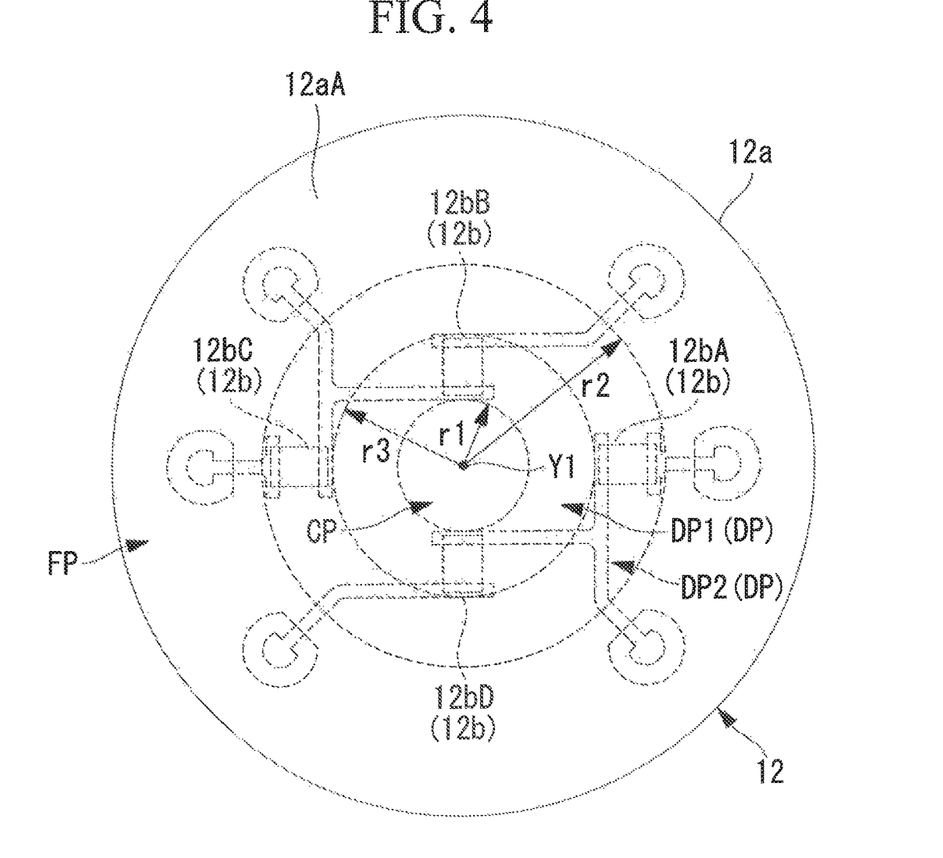
FIG. 4 is a view of a diaphragm of the pressure detection unit shown in FIG. 3 as viewed from above along an axis.

FIG. 4 is a view of the diaphragm 12a of the pressure detection unit 10 shown in FIG. 3 as viewed from above along the axis Y1. In FIG. 4, the illustration of the sensor holding portion 14 is omitted. FIG. 4 is a view of the diaphragm 12a as viewed from the first surface 12aA side. Accordingly, four strain resistance portions 12b (12bA, 12bB, 12bC, 12bD) attached to the second surface 12aB of the diaphragm 12a are shown by imaginary lines.

A center portion CP shown in FIG. 4 is a center region of the second surface 12aB of the diaphragm 12a having a circular shape as viewed in a plan view. The center portion CP is a portion to which the end surface of the connection portion 11 is attached by an adhesive agent. The center portion CP is a region disposed inside a circumference having a radius r1 from the axis Y1. Displacement portions DP shown in FIG. 4 are regions disposed outside the circumference having the radius r1 from the axis Y1 and inside a circumference having a radius r2 from the axis Y1. The displacement portions DP are portions which are displaced along the axis Y1 when a pressure is transmitted to the diaphragm 12a from the connection portion 23 of the flow passage unit 20. A fixed portion FP shown in FIG. 4 is a portion which is sandwiched between the base portion 12c and the sensor holding portion 14, and which is attached to the base portion 12c by an adhesive agent (adhesive glass). The fixed portion FP is a portion which is not displaced even when a pressure is transmitted to the diaphragm 12a from the connection portion 23 of the flow passage unit 20.

As shown in FIG. 4, the four strain resistance portions 12b in this embodiment are attached to the displacement portions DP of the second surface 12aB of the diaphragm 12a. The displacement portions DP are regions of the second surface 12aB which exclude the center portion CP and the fixed portion FP. The four strain resistance portions 12b are attached to the regions other than the center portion CP. This is because the center portion CP is hardly displaced even when a pressure is transmitted to the diaphragm 12a from the connection portion 23. The center portion CP is hardly displaced because the center portion CP of the second surface 12aB of the diaphragm 12a is attached to the connection portion 11 by an adhesive agent.

Figure 5:
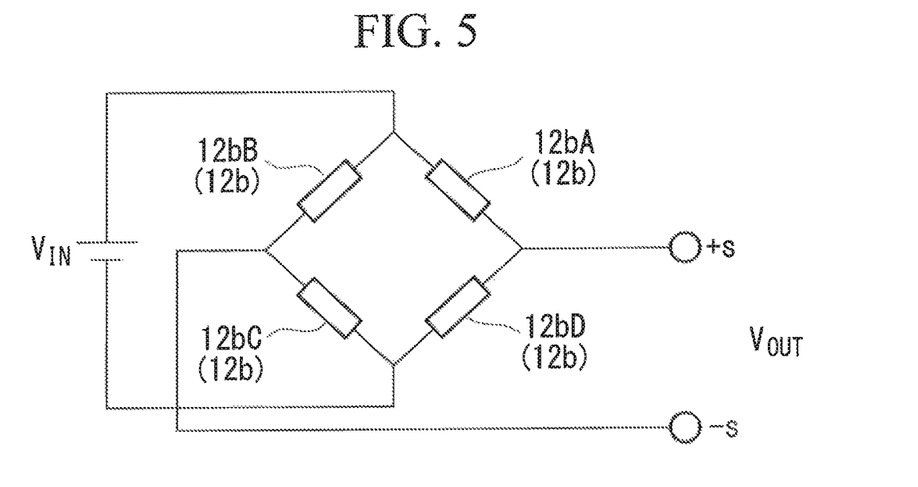
FIG. 5 is a view showing a Wheatstone bridge circuit formed by connecting four strain resistance portions by metal wires.

FIG. 5 shows a Wheatstone bridge circuit formed by connecting the four strain resistance portions 12b by metal wires. Resistance values of the four strain resistance portions 12b vary due to strain caused by a pressure transmitted to the diaphragm 12a. When a pressure is transmitted to the diaphragm 12a causing the resistance values of the four strain resistance portions 12b to vary, a value of an output voltage Vout with respect to an input voltage Vin varies. This value of the output voltage Vout is converted into a pressure of a fluid by the sensor board 15.

As shown in FIG. 4 and FIG. 5, in the pressure detection unit 10 in this embodiment, a pair of strain resistance portions 12bB, 12bD are disposed on two opposite sides of four sides of the Wheatstone bridge circuit. The pair of strain resistance portions 12bB, 12bD are disposed at a first displacement portion (first region) DP1 of the displacement portions DP. The first displacement portion DP1 is a region disposed adjacent to the center portion CP. The first displacement portion DP1 shown in FIG. 4 is a region disposed outside the circumference having the radius r1 from the axis Y1 and inside the circumference having the radius r3 from the axis Y1. The first displacement portion DP1 is a region where the strain resistance portions 12b extend along the radial direction when the diaphragm 12a is displaced by a transmitted pressure.

Further, as shown in FIG. 4 and FIG. 5, in the pressure detection unit 10 in this embodiment, a pair of strain resistance portions 12bA, 12bC are disposed on the other two opposite sides of four sides of the Wheatstone bridge circuit. The pair of strain resistance portions 12bA, 12bC are disposed at a second displacement portion (second region) DP2 of the displacement portions DP. The second displacement portion DP2 is a region further separated from the center portion CP than the first displacement portion DP1. The second displacement portion DP2 shown in FIG. 4 is a region disposed outside a circumference having a radius r3 from the axis Y1 and inside the circumference having the radius r2 from the axis Y1. The second displacement portion DP2 is a region where the strain resistance portions 12b contract along the radial direction when the diaphragm 12a is displaced by a transmitted pressure.

The sensor holding portion 14 is a member formed into a cylindrical shape about an axis Y1. An inner diameter of an upper end of the sensor holding portion 14 is smaller than an outer diameter of the pressure sensor 12 such that the sensor holding portion 14 can hold the pressure sensor 12 while preventing the removal of the pressure sensor 12 in the upward direction. The sensor holding portion 14 holds the fixed portion FP of the diaphragm 12a which is attached to the base portion 12c by an adhesive agent (adhesive glass).

The sensor board 15 includes: an amplifier circuit (not shown in the drawing) which amplifies a pressure signal outputted from the pressure sensor 12; an interface circuit which transmits the pressure signal, amplified by the amplifier circuit, to a pressure signal line (not shown in the drawing) of the cable 19; a power supply circuit (not shown in the drawing) which transmits a power supply voltage supplied from the outside through the cable 19 to the pressure sensor 12; a zero-point adjustment circuit (not shown in the drawing) which performs a zero-point adjustment when the zero-point adjustment switch 16 is pressed and the like.

The zero-point adjustment circuit is a circuit which performs an adjustment such that, when the zero-point adjustment switch 16 is pressed, a pressure signal outputted from the pressure sensor 12 at that point of time is set as a reference value (for example, zero).

FIG. 2 is a view showing a state where the flow passage unit 20 is removed from the pressure detection device 100 shown in FIG. 1. As shown in FIG. 2, in a state where the flow passage unit 20 is not mounted on the pressure detection unit 10, the diaphragm 12a of the pressure sensor 12 is exposed to the outside.

Figure 6:
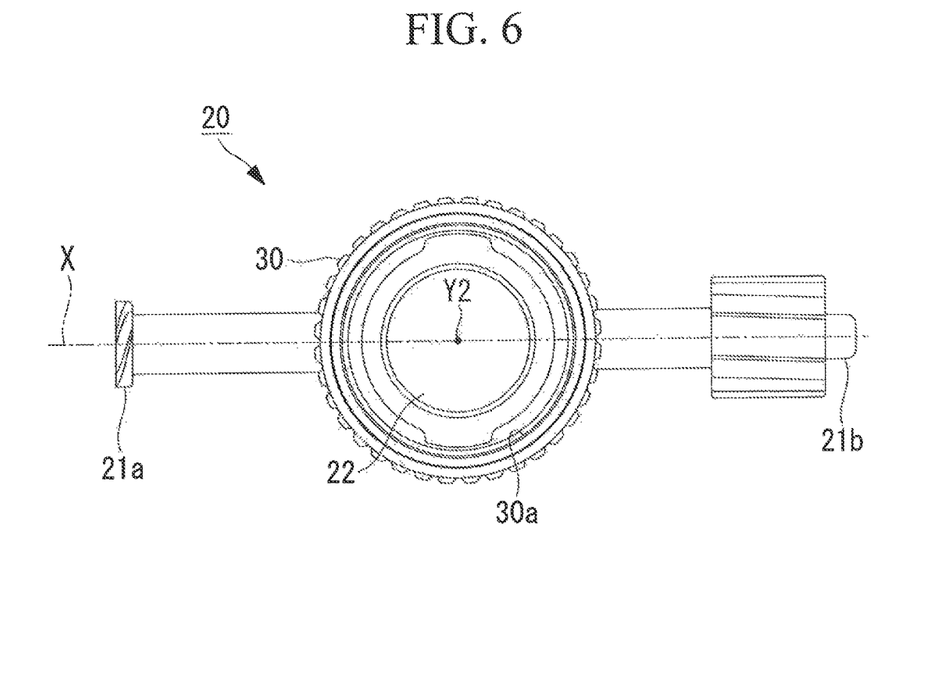
FIG. 6 is a back view of the flow passage unit shown in FIG. 1.
Figure 7:
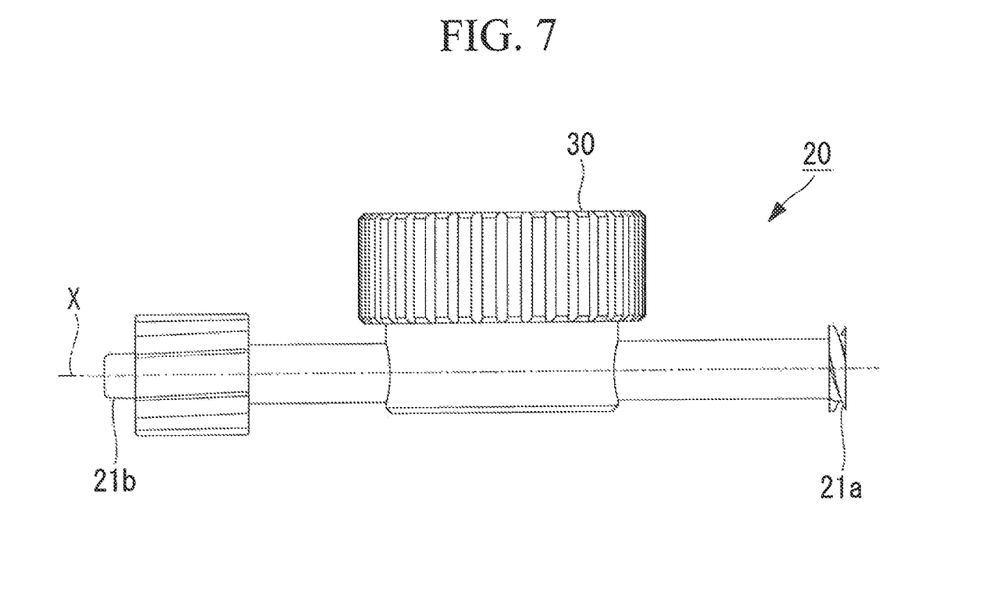
FIG. 7 is a bottom view of the flow passage unit shown in FIG. 1.

Next, the flow passage unit 20 is described in detail with reference to FIGS. 3, 6, 7. FIG. 6 is a back view of the flow passage unit shown in FIG. 1. FIG. 7 is a bottom view of the flow passage unit shown in FIG. 1.

As shown in FIGS. 3, 6, 7, the flow passage unit 20 includes: the flow passage 21; a diaphragm (pressure receiving diaphragm) 22; and the connection portion (first connection portion) 23. A fluid is made to flow through the flow passage 21 along a flow direction extending along the axis X from the inflow port 21a toward the outflow port 21b. The diaphragm 22 is displaced upon receiving a pressure of the fluid flowing through the flow passage 21 on a first surface 22a of the diaphragm 22. The connection portion 23 is attached to a second surface 22b of the diaphragm 22.

The diaphragm 22 is a member formed into a thin film shape using a material having corrosion resistance (for example, silicone resin material). The diaphragm 22 is a member formed into a circular shape as viewed in a plan view with the axis Y2 as a center axis. An outer peripheral edge portion of the diaphragm 22 is mounted on the flow passage 21 by bonding or by welding. Accordingly, there is no possibility that a fluid introduced into the flow passage 21 flows out to the outside from the flow passage 21. The diaphragm 22 is formed into a thin film shape such that the diaphragm 22 is deformed corresponding to a pressure of a fluid introduced into the flow passage 21.

Figure 8:
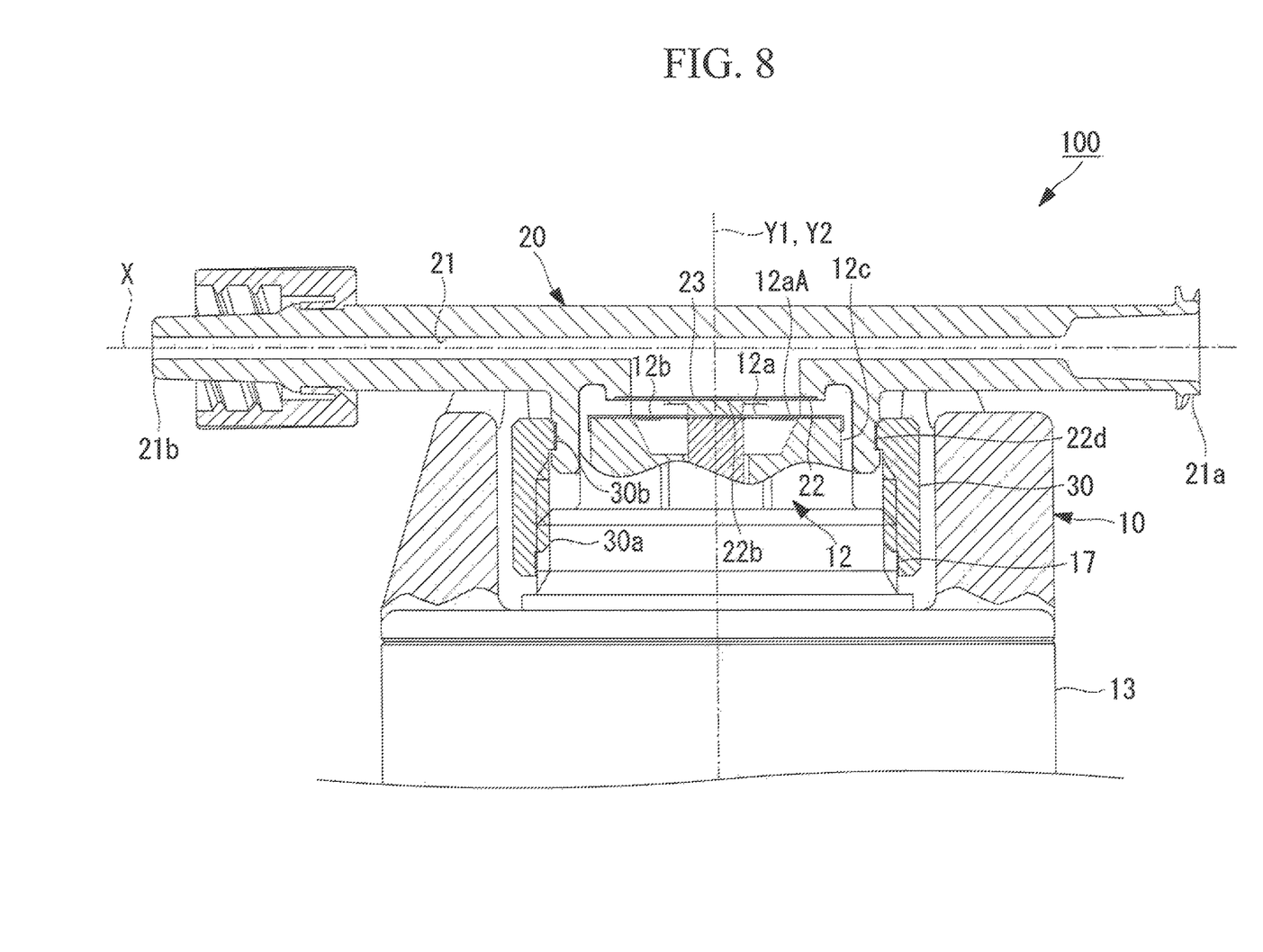
FIG. 8 is a cross-sectional view showing a state where the flow passage unit is mounted on the pressure detection device shown in FIG. 1 as viewed from an arrow I-I.

In a state shown in FIG. 8 where the flow passage unit 20 is mounted on the pressure detection unit 10, the connection portion 23 of the flow passage unit 20 is in contact with the first surface 12aA of the diaphragm 12a of the pressure detection unit 10. The connection portion 23 transmits a pressure of a fluid flowing through the flow passage 21 to the diaphragm 12a.

The connection portion 23 is formed of a magnetic body formed into a cylindrical shape along the axis Y1, and is made of an iron material such as S45C stipulated in the JIS standard. The connection portion 23 is attached to the second surface 22b of the diaphragm 22 on the pressure detection unit 10 side by an adhesive agent (for example, epoxy resin based adhesive agent). In a state where the flow passage unit 20 is mounted on the pressure detection unit 10 by the nut 30, the connection portion 23 is arranged such that the connection portion 23 is attracted by a magnetic force of the connection portion 11 formed of a permanent magnet.

As shown in FIG. 3, an endless annular groove portion 22d is formed on a lower end portion of an outer peripheral surface of the flow passage unit 20, and the annular groove portion 22d extends about the axis Y2. On the other hand, an endless annular protrusion portion 30b is formed on an inner peripheral surface of the nut 30, and the annular protrusion portion 30b extends about the axis Y2.

The nut 30 is made of an elastically deformable material (for example, resin material). When the nut 30 is pressed toward the annular groove portion 22d, the annular protrusion portion 30b is engaged with the annular groove portion 22d.

In a state shown in FIG. 3 where the annular protrusion portion 30b is engaged with the annular groove portion 22d, an extremely small gap is formed between an outer peripheral surface of the annular protrusion portion 30b and an inner peripheral surface of the annular groove portion 22d. Accordingly, in a state where the nut 30 is mounted on the pressure detection unit 10, the nut 30 is relatively rotatable about the axis Y1. With such a configuration, an operator can rotate the nut 30 about the axis Y1 in a state where the pressure detection unit 10 is fixed to the installation surface S.

As shown in FIG. 3, the nut 30 is a circular annular member where a female thread 30a extending about the axis Y2 is formed on an inner peripheral surface thereof. The nut 30 is a mechanism which allows the flow passage unit 20 to be detachably mounted on the pressure detection unit 10 by causing the female thread 30a to be fastened to a male thread 17 formed on the pressure detection unit 10, or by releasing the fastening between the female thread 30a and the male thread 17.

The operator rotates the nut 30 about the axis Y1 in the fastening direction (the direction indicated by "LOCK" in FIG. 1 and FIG. 2) while grasping the flow passage unit 20. With such operations, the female thread 30a of the nut 30 and the male thread 17 of the pressure detection unit 10 are fastened to each other. By fastening the female thread 30a of the nut 30 and the male thread 17 of the pressure detection unit 10 to each other, the connection portion 23 gradually approaches the first surface 12aA of the diaphragm 12a, and eventually comes into contact with the first surface 12aA of the diaphragm 12a. Accordingly, a state shown in FIG. 8 is brought about.

The description is made with respect to the manner of operation and advantageous effects which the above-described pressure detection device 100 of this embodiment can acquire.

According to the pressure detection device 100 of this embodiment, in a state where the flow passage unit 20 is mounted on the pressure detection unit 10 by the nut 30, the connection portion 23, which is attached to the second surface 22b of the diaphragm 22, and the connection portion 11, which is attached to the center portion CP of the second surface 12aB of the diaphragm 12a, are arranged such that the connection portion 23 and the connection portion 11 are attracted by a magnetic force. With such a configuration, when a pressure of a fluid flowing through the flow passage 21 is a positive pressure, the connection portion 23 attached to the diaphragm 22 is separated from the flow passage 21 side by the pressure of the fluid, and the connection portion 23 is pressed toward the first surface 12aA of the diaphragm 12a. Accordingly, a pressure of the fluid is detected by the four strain resistance portions 12b attached to the second surface 12aB of the diaphragm 12a as a positive pressure.

On the other hand, when a pressure of a fluid flowing through the flow passage 21 is a negative pressure, the connection portion 23 attached to the second surface 22b of the diaphragm 22 is pulled toward the flow passage 21 side by the pressure of the fluid, and the connection portion 23 pulls the connection portion 11 connected to the connection portion 23 by a magnetic force to the flow passage 21 side. Accordingly, a pressure of the fluid is detected by the four strain resistance portions 12b on the diaphragm 12a as a negative pressure.

Further, the four strain resistance portions 12b are attached to the region of the second surface 12aB of the diaphragm 12a other than the center portion CP. Accordingly, compared to a case where the strain resistance portions 12b are disposed at the center portion CP of the diaphragm 12a where the displacement is suppressed due to attachment of the connection portion 11, the reduction of pressure detection accuracy can be suppressed.

As described above, according to the pressure detection device 100 of this embodiment, it is possible to provide the pressure detection device 100 which adopts a mechanism enabling accurate detection of a pressure of a fluid, even when the pressure of the fluid is a negative pressure, while suppressing the reduction of pressure detection accuracy.

In the pressure detection device 100 of this embodiment, the pair of strain resistance portions 12bB, 12bD are disposed at positions of two opposite sides of four sides of the Wheatstone bridge circuit, and the pair of the strain resistance portions 12bB, 12bD are disposed at the first displacement portion DP1 disposed adjacent to the center portion CP. The pair of strain resistance portions 12bA, 12bC are disposed at positions of the other two opposite sides of the four sides of the Wheatstone bridge circuit, and the pair of strain resistance portions 12bA, 12bC are disposed at the second displacement portion DP2 which is further separated from the center portion CP than the first displacement portion DP1.

The first displacement portion DP1 disposed adjacent to the center portion CP of the diaphragm 12a is liable to extend with the displacement caused by a pressure. The second displacement portion DP2, which is further separated from the center portion CP than the first displacement portion DP1, is liable to contract with the displacement caused by a pressure. By disposing the four strain resistance portions 12b at the first displacement portion DP1 and the second displacement portion DP2, pressure detection accuracy is enhanced.

In the pressure detection device 100 of this embodiment, the connection portion 23 is formed of a magnetic body, and the connection portion 11 is formed of a magnet. The flow passage unit 20 which is to be replaced after use is formed using a magnetic body which is relatively cheap. Accordingly, running costs for continuous use of the pressure detection device 100 can be reduced.

Second Embodiment

Next, a pressure detection device according to a second embodiment of the present disclosure is described with reference to drawings.

The second embodiment is a modification of the first embodiment. Hereinafter, unless otherwise specified, the second embodiment is assumed equal to the first embodiment such that the same constitutional elements are given the same reference characters, and the description of such constitutional elements is omitted.

In the pressure detection device 100 of the first embodiment, each of the four strain resistance portions 12bA, 12bB, 12bC, 12bD which form the Wheatstone bridge circuit is formed of a single strain resistance element. On the other hand, in the pressure detection device of this embodiment, each of four strain resistance portions 12bA, 12bB, 12bC, 12bD which form a Wheatstone bridge circuit is formed of a plurality of strain resistance elements.

Figure 9:
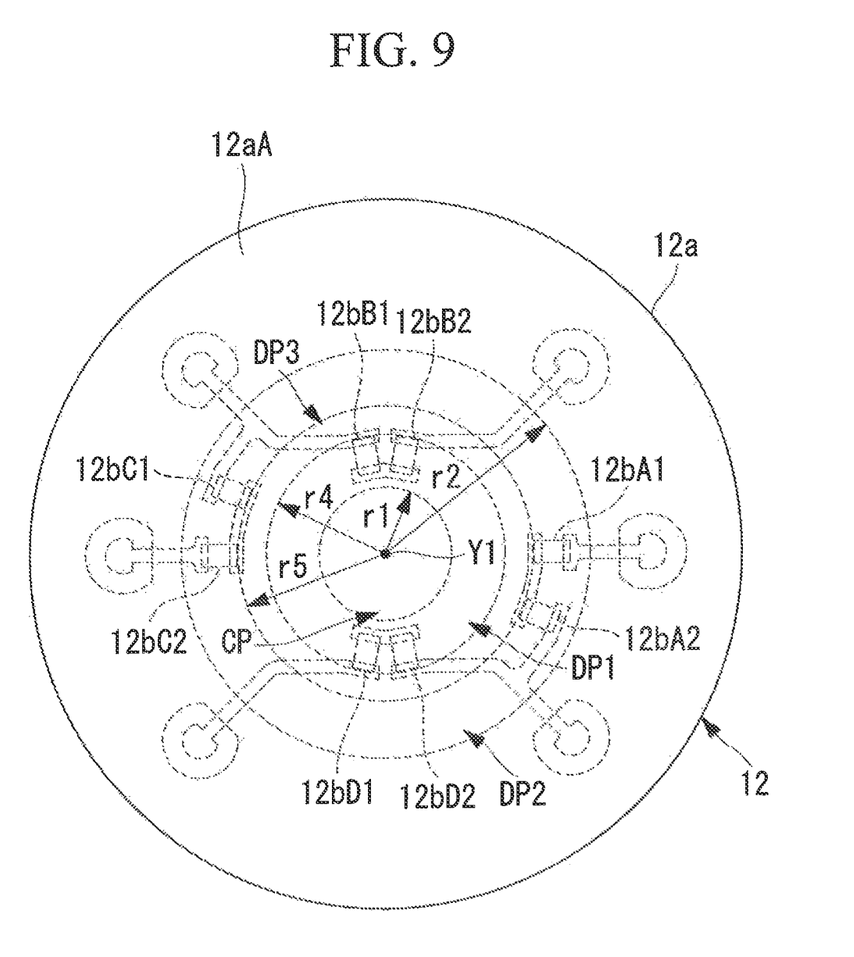
FIG. 9 is a view of a diaphragm of a pressure detection unit according to a second embodiment as viewed from above along an axis.

FIG. 9 is a view of a diaphragm 12a of the pressure detection unit of the second embodiment as viewed from above along the axis Y1, and is also a view as viewed from the same direction as FIG. 4 in the first embodiment.

As shown in FIG. 9, the strain resistance portion 12bA in this embodiment is configured such that two elements consisting of a strain resistance element 12bA1 and a strain resistance element 12bA2 are disposed at different positions in the circumferential direction about the center portion CP. In the same manner, the strain resistance portion 12bB in this embodiment is configured such that two elements consisting of a strain resistance element 12bB1 and a strain resistance element 12bB2 are disposed at different positions in the circumferential direction about the center portion CP. In the same manner, the strain resistance portion 12bC in this embodiment is configured such that two elements consisting of a strain resistance element 12bC1 and a strain resistance element 12bC2 are disposed at different positions in the circumferential direction about the center portion CP. In the same manner, the strain resistance portion 12bD in this embodiment is configured such that two elements consisting of a strain resistance element 12bD1 and a strain resistance element 12bD2 are disposed at different positions in the circumferential direction about the center portion CP.

As shown in FIG. 9, in the pressure detection unit in this embodiment, pairs of strain resistance portions 12bB (12bB1, 12bB2), 12bD (12bD1, 12bD2) are disposed on two opposite sides of four sides of the Wheatstone bridge circuit. The pairs of strain resistance portions 12bB (12bB1, 12bB2), 12bD (12bD1, 12bD2) are disposed at a first displacement portion (first region) DP1 of displacement portions DP. The first displacement portion DP1 is a region disposed adjacent to the center portion CP. The first displacement portion DP1 is a region where the strain resistance portions 12b extend along the radial direction when the diaphragm 12a is displaced by a transmitted pressure.

As shown in FIG. 9, in the pressure detection unit in this embodiment, pairs of strain resistance portions 12bA (12bA1, 12bA2), 12bC (12bC1, 12bC2) are disposed on the other two opposite sides of four sides of the Wheatstone bridge circuit. The pairs of strain resistance portions 12bA (12bA1, 12bA2), 12bC (12bC1, 12bC2) are disposed at a second displacement portion (second region) DP2 of the displacement portions DP. The second displacement portion DP2 is a region further separated from the center portion CP than the first displacement portion DP1. The second displacement portion DP2 is a region where the strain resistance portions 12b contract along the radial direction when the diaphragm 12a is displaced by a transmitted pressure.

As shown in FIG. 9, a third displacement portion DP3 is formed on the second surface 12aB of the diaphragm 12a. The third displacement portion DP3 is further separated from the center portion CP than the first displacement portion DP1, and is closer to the center portion CP than the second displacement portion DP2. The third displacement portion DP3 is a region within a range larger than a radius r4 from the axis Y1 and smaller than a radius r5 from the axis Y1. As shown in FIG. 9, the strain resistance portion 12b is not disposed at the third displacement portion DP3.

The third displacement portion DP3 includes a region which has a minimum amount of deformation in the radial direction when a pressure is transmitted to the diaphragm 12a from the connection portion 23. The third displacement portion DP3, where the strain resistance portion 12b forming the Wheatstone bridge circuit is not disposed, is formed on the diaphragm 12a. The reason is to suppress the reduction of pressure detection accuracy caused by disposing the strain resistance portion 12b in the region which has a minimum amount of deformation in the radial direction when a pressure is transmitted to the diaphragm 12a.

A resistance value of each of the strain resistance element 12bA1 and the strain resistance element 12bA2 is equal to a resistance value of the strain resistance portion 12b (12bA, 12bB, 12bC, 12bD) in the first embodiment. Accordingly, a combined resistance value obtained by connecting two elements consisting of the strain resistance element 12bA1 and the strain resistance element 12bA2 in series is twice as great as a resistance value of the strain resistance portion 12bA in the first embodiment. Assume that an input voltage Vin of the Wheatstone bridge circuit shown in FIG. 5 in this embodiment is set equal to the input voltage in the first embodiment. In such a case, an electric current which flows through the strain resistance element 12bA1 and the strain resistance element 12bA2 is halved. On the other hand, the combined resistance value is doubled. Accordingly, assuming that a displacement amount of the diaphragm 12a is uniform, an output voltage Vout from the Wheatstone bridge circuit is equal to the output voltage in the first embodiment. Therefore, it is possible to use the same sensor board as the first embodiment.

According to the pressure detection device of this embodiment, the third displacement portion (third region) DP3 is formed on the second surface 12aB of the diaphragm 12a. The third displacement portion DP3 is further separated from the center portion CP than the first displacement portion DP1, and is closer to the center portion CP than the second displacement portion DP2. The third displacement portion DP3 includes a region which has a minimum amount of deformation in the radial direction when a pressure is transmitted from the connection portion 23.

With such a configuration, the four strain resistance portions 12b are disposed at the first displacement portion DP1 and the second displacement portion DP2 which are not the third displacement portion DP3. The strain resistance portions 12b are disposed in a region having a large amount of deformation in the radial direction caused by a pressure. Accordingly, compared to a case where the strain resistance portions 12b are disposed at the third displacement portion DP3 which includes a region which has a minimum amount of deformation in the radial direction when a pressure is transmitted from the connection portion 23, pressure detection accuracy is enhanced.

According to the pressure detection device of this embodiment, each of the four strain resistance portions 12b includes a plurality of strain resistance elements. The plurality of strain resistance elements are disposed at different positions in the circumferential direction about the center portion CP.

The plurality of strain resistance elements which form the four strain resistance portions 12b are disposed at different positions in the circumferential direction. With such a configuration, even when displacement of the diaphragm 12a differs at respective positions on the same circumference about the center portion CP, the difference in displacement can be averaged by the plurality of strain resistance elements such that the reduction of pressure detection accuracy can be suppressed.

The invention claimed is:

1. A pressure detection device comprising:
a flow passage unit in which a flow passage for introducing a fluid is formed;
a pressure detection unit configured to detect a pressure of the fluid; and
a mounting mechanism by which the flow passage unit is detachably mounted on the pressure detection unit, wherein
the flow passage unit includes:
a pressure receiving diaphragm configured to be displaced upon receiving the pressure of the fluid flowing through the flow passage on a first surface of the pressure receiving diaphragm; and
a first connection portion attached to a second surface of the pressure receiving diaphragm,
the pressure detection unit includes:
a pressure detecting diaphragm having a first surface to which a pressure is to be transmitted from the first connection portion;
a second connection portion attached to a center portion of a second surface of the pressure detecting diaphragm; and
four strain resistance portions attached to the second surface of the pressure detecting diaphragm, the strain resistance portions being connected to each other so as to form a Wheatstone bridge circuit,
one of either the first connection portion or the second connection portion is formed of a magnet, and the other of either the first connection portion or the second connection portion is formed of a magnet or a magnetic body,
the first connection portion and the second connection portion are arranged such that the first connection portion and the second connection portion are attracted by a magnetic force in a state where the flow passage unit is mounted on the pressure detection unit by the mounting mechanism, and
the four strain resistance portions are attached to a region of the second surface of the pressure detecting diaphragm other than the center portion.

2. The pressure detection device according to claim 1, wherein:
a pair of the strain resistance portions are disposed at positions of two opposite sides of four sides of the Wheatstone bridge circuit, and the pair of the strain resistance portions are disposed in a first region disposed adjacent to the center portion, and
a pair of the strain resistance portions are disposed at positions of the other two opposite sides of the four sides of the Wheatstone bridge circuit, and the pair of the strain resistance portions are disposed in a second region which is further separated from the center portion than the first region.

3. The pressure detection device according to claim 2, wherein:
a third region is formed on the second surface of the pressure detecting diaphragm, the third region being further separated from the center portion than the first region, and being closer to the center portion than the second region, and
the third region includes a region which has a minimum amount of deformation in a radial direction in a state where a pressure is transmitted from the first connection portion.

4. The pressure detection device according to claim 1, wherein:
each of the four strain resistance portions includes a plurality of strain resistance elements; and
the plurality of strain resistance elements are disposed at different positions in a circumferential direction about the center portion.

5. The pressure detection device according to claim 2, wherein:
each of the four strain resistance portions includes a plurality of strain resistance elements; and
the plurality of strain resistance elements are disposed at different positions in a circumferential direction about the center portion.

6. The pressure detection device according to claim 1, wherein:
the first connection portion is formed of a magnetic body; and
the second connection portion is formed of a magnet.

7. A pressure sensor comprising:
a pressure detecting diaphragm having a first surface to which a pressure is to be transmitted;
a connection portion attached to a center portion of a second surface of the pressure detecting diaphragm, the connection portion being formed of a magnet or a magnetic body; and
four strain resistance portions attached to the second surface of the pressure detecting diaphragm, the strain resistance portions being connected to each other so as to form a Wheatstone bridge circuit, wherein:
the four strain resistance portions are attached to a region of the second surface of the pressure detecting diaphragm other than the center portion.

* * * * *